United States Patent [19]

Nishikawa

[11] Patent Number: 5,021,950
[45] Date of Patent: Jun. 4, 1991

[54] MULTIPROCESSOR SYSTEM WITH STANDBY FUNCTION

[75] Inventor: Akihito Nishikawa, Ichikawa, Japan

[73] Assignee: Kabushiki Kaisha Toshiba, Kawasaki, Japan

[21] Appl. No.: 808,180

[22] Filed: Dec. 12, 1985

[30] Foreign Application Priority Data

Dec. 27, 1984 [JP] Japan ................. 59-278231

[51] Int. Cl.$^5$ .............................................. G06F 1/32
[52] U.S. Cl. ................... 364/200; 364/229.2; 364/242.92; 364/268.9; 364/273.1; 364/273.4
[58] Field of Search ... 364/200 MS File, 900 MS File

[56] References Cited

U.S. PATENT DOCUMENTS

| | | | |
|---|---|---|---|
| 4,084,233 | 4/1978 | Handly et al. | 364/200 |
| 4,257,095 | 3/1981 | Nadir | 364/200 |
| 4,320,457 | 3/1982 | Tanikawa | 364/200 |
| 4,348,722 | 9/1982 | Gunter et al. | 364/200 |
| 4,365,294 | 12/1982 | Stokken | 364/200 |
| 4,387,425 | 6/1983 | El-Gohary | 364/200 |
| 4,620,278 | 10/1986 | Ellsworth et al. | 364/200 |
| 4,649,471 | 3/1987 | Briggs et al. | 364/200 |
| 4,757,439 | 7/1988 | Stinson et al. | 364/200 |
| 4,777,591 | 10/1988 | Chang et al. | 364/200 |

FOREIGN PATENT DOCUMENTS

0058948 9/1982 European Pat. Off. .

OTHER PUBLICATIONS

*INTEL Microprocessor and Peripherals Handbook,* INTEL 8288 Bus Controller and INTEL 8289 Bus Arbiter, Chapter 3, pp. 247-264, 1982.
Patent Abstracts of Japan, vol. 6, No. 88 (P—118) [966], 5/26/82.
Patent Abstracts of Japan, vol. 6, No. 27 (P—102) [905], 2/17/82.
Starnes article "Detect and Correct Data Errors Without Slowing Bus Traffic," Mar. 1982, Electrical Design News, vol. 27, No. 7, Boston, Mass.
Barthmaier, INTEL iSBC Applications Handbook, AP—28A, Intel MULTIBUS TM Interfacing, Jul. 1980.

*Primary Examiner*—Gareth D. Shaw
*Assistant Examiner*—Matthew C. Fagan
*Attorney, Agent, or Firm*—Finnegan, Henderson, Farabow, Garrett, and Dunner

[57] ABSTRACT

A multiprocessor system is comprised of a bus and a plurality of processor modules. Each processor module includes a bus arbitration block, a bus access control block, an address output block, a data input/output block, a clock signal generating block, a stop request block for requesting the stop of supplying a clock signal, an operation processing block for processing data, and a stop control block. The stop control block stores the contents of the bus access (a type of the bus, the address and data concerning the access, etc.) as is made by the operation processing block when the clock signal is stopped, and to what clock of that access cycle the bus access proceeds. The stop control block controls the bus arbitration block to electrically disconnect the processor module from the bus. After the restart of supplying the clock signal, the bus arbitration block, the bus access control block, the address output block and the data input/output block are restored on the basis of the contents of the bus access. Then the bus access that was stopped is resumed from its beginning. When the number of clocks of the clock signal is equal to that stored in the memory block after the restart of supplying the clock signal, the stop control block supplies again the clock signal to the operation processing block. Subsequently, the operation processing block continues the bus access.

10 Claims, 5 Drawing Sheets

MULTIPROCESSOR SYSTEM WITH STANDBY FUNCTION

BACKGROUND OF THE INVENTION

The present invention relates to improvements of a multiprocessor system.

In the multiprocessor system, a plurality of processor modules are connected to a common bus. Each processor module contains a clock signal supply block, a bus arbitration block, a bus control block, an address output block, a data input/output block, an internal bus, and an operation processing block (CPU).

In the processor module, when a bus access request is issued from the operation processing block, the bus arbitration block artibitrates the use of the common bus between the processor-module and the other processor modules. If none of the other processor modules is accessing the common bus, the requesting processor module obtains the right of using the common bus. When a plurality of processor modules simultaneously attempt to access the common bus, they are priority ordered and the processor module with the highest priority obtains the first access, then the module with the next high priority obtains the next access, and so on. The bus arbitration block having assigned bus access, activates level busy signal BS announcing to other processor modules that access has been assigned. The bus arbitration block then enables the bus control block and the address output block. Subsequently, addresses and data may be transferred between the operation processing output block and the common bus.

The processor module can be constructed with CMOS and can have a standby mode. In the standby mode, the supply of a clock signal is stopped during its operation to reduce power consumption. The conventional multiprocessor system, however, cannot accommodate the standby mode. This is a disadvantage of the conventional multiprocessor system. Another disadvantage of the conventional system is that when one processor module stops its operation, due to a failure which can be self-diagnosed, none of other processor modules can use the common bus. Specifically, when one processor module stops its operation while it is accessing its access to the common bus, the remaining processor modules cannot use the bus until all of the processor modules are temporarily disconnected from the common bus. In other words, to allow the use of the common bus by the remaining processor module, the busy signals of all of the processor modules must be temporarily made inactive.

In the conventional multiprocessor system, if one processor module stops during its access to the common bus, the busy signal of this processor module remains active. Therefore, the remaining processor modules are prohibited from subsequent use of the common bus.

Thus, the conventional multiprocessor system will not permit an individual system design which has a 1 standby function and allows operation stop due to a failure which can be self-diagnosed.

SUMMARY OF THE INVENTION

An object of the present invention is to provide a multiprocessor system which can continue the system operation even if one processor module stops during its access of the common bus.

To achieve the above object, there is provided a multiprocessor system having a bus (13) for transmitting data, and a plurality of multiprocessor modules (11) each performing predetermined data processing and each connected to the bus (13), in which each of the processor modules (11) is comprised of means (21, 61, 71) for disconnecting the processor module (11) from the bus (13) when a stop request is issued by the processor module (11), means (55, 57, 63, 65) for storing the contents of the processor module (11) when a stop request is issued to the bus, and control means (31, 51, 53, 61, 67, 69, 71, 73) for executing the same bus access which said processor module (11) was performing when the stop request was issued, in accordance with the contents of said memory means (55, 57, 63, 65) after the stop request has been cancelled, and for causing said processor module (11) to process data, when the bus access reaches the same condition as said processor module (11) was executing on the bus (13) when the stop request was issued.

With such an arrangement, even if one processor module stops while accessing the bus, another processor module can assert control of the bus. The processor module which temporarily stopped the use of the bus can also restart its operation continuous with its previous operation after the cause of the stoppage is removed. If the processor module is constructed in CMOS, the standby mode can be realized. Therefore, the power consumption of the multiprocessor system can be reduced.

DETAILED DESCRIPTION OF THE PREFERRED EMBODIMENT

A multiprocessor system according to a first embodiment of the present invention will be described referring to the accompanying drawings.

An overall system of the multiprocessor system will first be given referring to FIG. 1.

As shown, a plurality of processor modules 11 are connected to a common bus 13, hereafter simply bus. A common memory 15, an input/output (I/O) unit 17, and the like, if necessary, are further connected to the bus 13. Each processor module performs data processing according to a program assigned to the processor. The same also transfers data to and from other processor modules, the memory 15 and the I/O unit 17.

Figure 2:
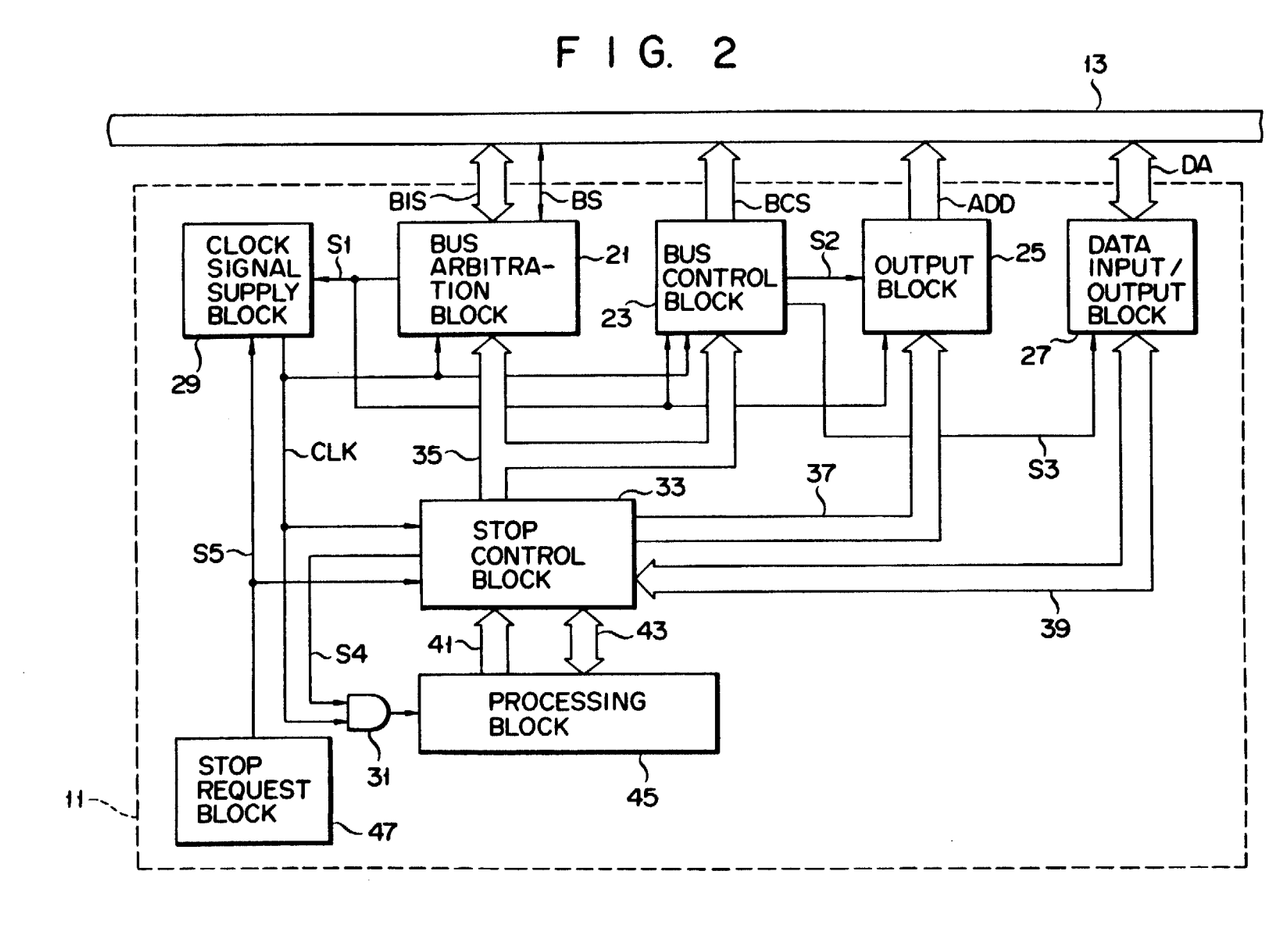
FIG. 2 is a block diagram showing an arrangement of a processor module used in the multiprocessor system of FIG. 1.

An arrangement of a single processor module will representatively be described referring to FIG. 2.

One processor module 11 contains a bus arbitration block 21, a bus control block 23, an address output block 25, and a data input/output block 27, which are connected to the bus 13. The bus arbitration block 21 transfers a bus interface signal BIS and a busy signal BS to and from the bus 13. The bus control block 23 outputs a bus command signal BCS to the bus 13. The address output block 25 outputs address data ADD to the bus 13. The data input/output block 27 transfers data DA to and from the bus 13.

A control signal S1 output from the bus arbitration block 21 is supplied to a clock signal supply block 29. The control signal S1 is also supplied to the bus control block 23 and the address output block 25. An output signal S2 from the bus control block 23 is supplied to the address output block 25. An output signal S3 of the bus control block 23 is supplied to the data input/output block 27. The clock signal supply block 29 outputs a clock signal CLK. The clock signal CLK is delivered to one of the input terminals of an AND gate 31, a stop control block 33, the bus arbitration block 21 and the bus control block 23. The stop control block 33 is connected through a first access bus 35 to the bus arbitration block 21 and the bus control block 23. The stop control block 33 is connected through an address bus 37 to the address output block 25. The stop control block 33 is coupled with the data input/output block 27 by way of a data bus 39. The stop control block 33 is connected to an operation processing block 45, through a second access bus 41 and an address/data bus 43. The stop control block 33 supplies a restart signal S4 to the other input of the AND gate 31. The output signal of the AND gate 31 is supplied to a clock input terminal of the operation processing block 45.

The processor module 11 further contains a stop request block 47. The output terminal of the stop request block 47 is connected to the stop control block 33 and the clock signal supply block 29, and outputs a stop request signal S5.

The operation of the processor module 11 thus arranged will be given.

A normal mode (where the clock signal CLK is not stopped) of operation of the processor module 11 will first be given.

In a normal mode, the stop request block 47 produces the stop request signal S5 as a L (inactive) level. Upon receipt of the stop request signal S5, the clock signal supply block 29 outputs the clock signal CLK. The clock signal CLK is delivered to the bus arbitration block 21, the bus control block 23, AND gate 31, and the stop control block 33. The stop control block 33, upon receipt of the clock signal CLK, produces the restart signal S4 as a H (active) level and supplies it to the other input of the AND gate 31. The AND gate 31 is enabled by this H level signal, to allow the clock signal CLK to go to the operation processing block 45. The operation processing block 45, upon receipt of the clock signal CLK, performs data processing according to a program already prepared for it. When receiving a stop request signal S5 as a L level from the stop request block 47, the stop control block 33 supplies to the first access bus 35 a bus access request which comes through the second access bus 41 from the operation processing block 45. The stop control block 33 supplies to the address bus 37 an address signal appearing on the address/data bus 43, and also supplies a data signal to the data bus 39. The stop control block 33 supplies the data appearing on the data bus 39 to the address/data bus 43. In such a situation, the operation processing block 45 executes the data processing according to the program.

Under this condition, the operation processing block 45 operates as if it is directly connected to the bus arbitration block 21, the bus control block 23, the address output block 25 and the data input/output block 27.

When a bus access request is issued by the operation processing block 45, this request is supplied through the buses 41 and 35 to the bus arbitration block 21. Upon receipt of this request, the bus arbitration block 21 communicates with the other processor modules to arbitrate the use of the bus 13. At this time, if none of the other processor modules has accessed to the bus 13, the requesting processor module 11 obtains the right of using the common bus 13. Then, the bus arbitration block 21 sets the busy signal BS active, or H level, and the output control signal S1 in H level, so that the bus control block 23 is enabled. The bus control block 23 outputs to the bus 13 a bus control command signal based on the bus access request, which is on the first access bus 35. Subsequently, under control of the bus control block 23, the transfer of the address signal and the data signal, by the signals S2 and S3, is performed between the operation processing block 45 and the bus 13, through the address output block 25 and the data input/output block 27.

Let us assume that the supply of the clock signal CLK must be stopped due to a failure of the processor module 11 or, alternatively, due to the need for a standby mode.

In this case, the stop request block 47 renders the stop request signal S5 H level (active). Upon receipt of this H level stop request signal S5, the clock signal supply block 29 stops outputting the clock signal CLK. In response to the stop request signal S5 of H level, the stop control block 33 renders inactive the bus access request directed to the bus arbitration block 21 and the bus control block 23. In other words, the signals concerning the bus access request on the first access bus 35 are all set, for example, in H level. Therefore, the output control signal S1 is made inactive, that is, set in L level, so that the processor module 11 is disconnected from the common bus 13. The bus arbitration block 21 causes the busy signal BS to be in L level.

At this time, the stop control block 33 stores the bus access state which includes the type of the bus access request from the operation processing block 45, and the state of the bus access, address and data. The type of the bus access request means either the data write operation or the data read operation which the operation processing block 45 was performing on the memory 15, the I/O unit 17 and the like (FIG. 1) immediately before the stoppage. The bus access state indicates up to what time point the write or read operation proceeded at the stoppage.

Let us then assume that the cause to stop the clock signal CLK supply becomes invalid.

In this case, the stop request block 47 sets the stop request signal S5 at L level. In response to the stop request signal S5 L level, the clock signal supply block 29 restarts the supply of the clock signal CLK. The stop control block 33 does not cause the restart signal S4 to go high immediately after the signal S5 is pulsed to L level. For this reason, immediately after the signal S5 is pulsed to L level, the operation processing block 45 does not restart its data processing operation.

The processing by the operation processing block 45, which was occurring just before the stoppage of the clock signal CLK, is executed again by the stop control block 33. The stop control block 33 performs such control on the basis of the type of the bus access request and the bus status at the stoppage time, which have been stored in the stop control block 33. On the basis of this control, the bus arbitration block 21 artibitrates the use of the bus 13 among the processor modules containing this stop control block 33 and other processor modules. When the bus arbitration block 21 gains the right to use the common bus, the busy signal BS is raised to H level. The stop control block 33 raises the signal S4 to H level when the processing by the stop control block 33 progresses to the state where the stoppage occurred. With the active level of the signal S4, the AND gate 31 applies the clock signal CLK to the operation processing block 45. Subsequently, the operation processing block 45 continuously executes the operation after the stoppage of the clock signal CLK, through the stop control block 33.

Figure 3:
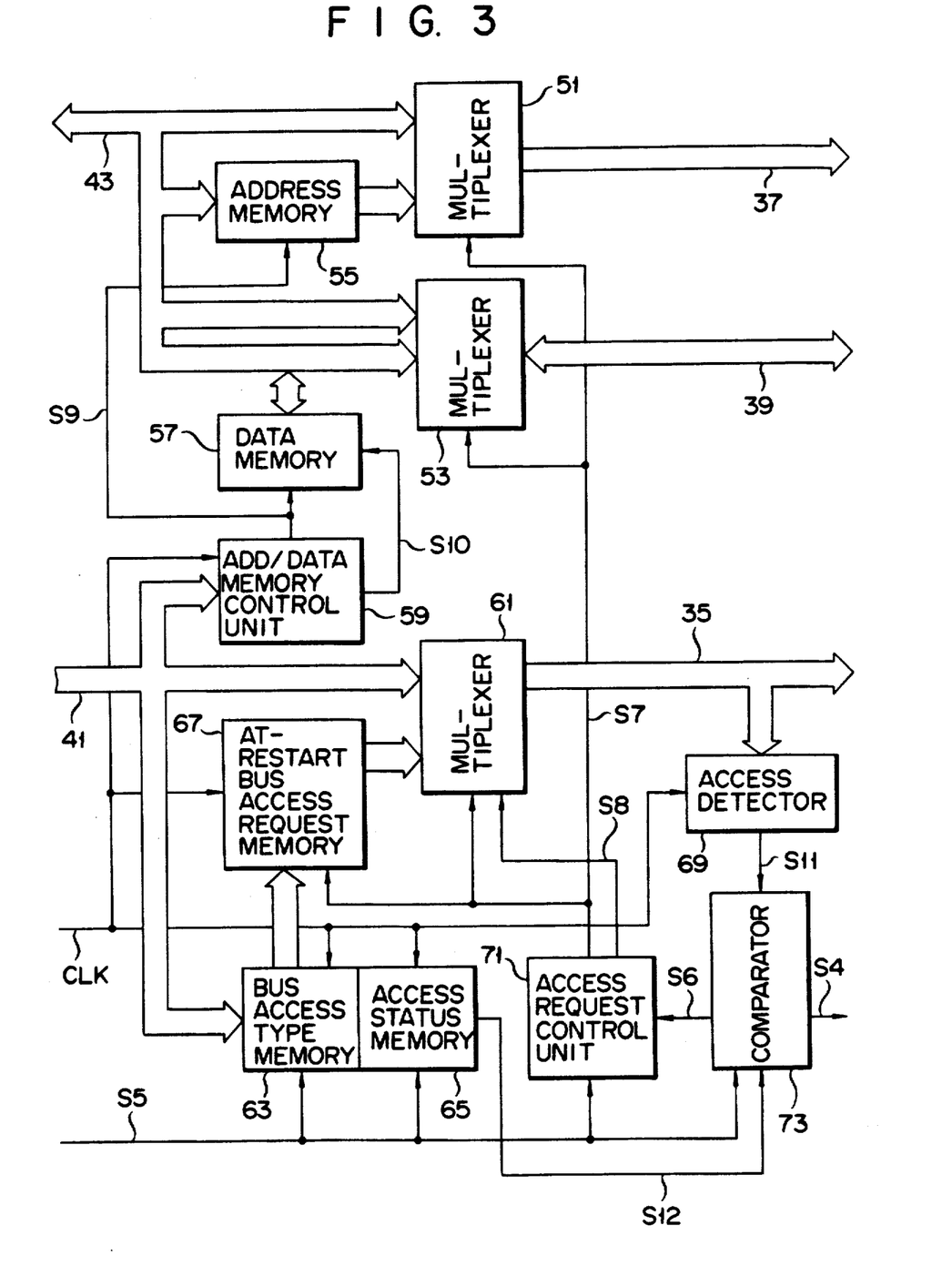
FIG. 3 is a block diagram showing a stop control block used in the processor module shown in FIG. 2.

An example of the arrangement of the stop control block 33 will be given referring to FIG. 3.

The address/data bus 43 is connected to multiplexers 51 and 53, an address memory 55 and a data memory 57. The address memory 55 is connected to the multiplexer 51. The multiplexer 51 is further connected to the data bus 37. The multiplexer 53 is further connected to the data bus 39. The second access bus 41 is coupled with an address/data memory control unit 59, a multiplexer 61, a bus access type memory 63 and an access status memory 65. The bus access type memory 63 is connected to the at-restart bus access request memory 67. The at-restart bus access request memory 67 is connected to the multiplexer 61. The multiplexer 61 is coupled with the first access bus 35. The first access bus 35 is connected to an access detector 69.

Various types of signals are transferred among those circuits. The stop request signal S5 is applied to an access request control unit 71, a comparator 73, the bus access type memory 63 and the access status memory 65. The clock signal CLK is supplied to the bus access type memory 63, the access status memory 65, the access detector 69, the at-restart bus access request memory 67 and the address/data memory control unit 59. The access status memory 65 produces a signal S12 to the comparator 73. A signal S11 output by the access detector 69 is supplied to the comparator 73. The comparator 73 applies a coincident signal S6 to the access request control unit 71 and produces the restart signal S4. The access request control unit 71 supplies a control signal S7 to the multiplexers 51, 53 and 61, and the at-restart bus access request memory 67. The access request control unit 71 applies a prohibit signal S8 to the multiplexer 61. The address/data memory control unit 59 supplies a memory control signal S9 to the data memory 57 and the address memory 55. The address/data memory control unit 59 outputs a control signal S10 to the data memory 57.

The operation of the circuit shown in FIG. 3 will be described. Let us consider a case where the operation processing block 45 performs a normal operation (the clock signal CLK is being output).

In this case, the signal S5 is L level. The access request control unit 71 makes the signal S7 L level. Receiving the L level signal S7, the multiplexers 51 and 53 select the address/data bus 43, and the multiplexer 61 selects the second access bus 41. Therefore, the address signal on the address/data bus 43 is output onto the address bus 37. The data signal on the address/data bus 43 is output onto the data bus 39. At other time the data signal on the data bus 39 is output onto the address/data bus 43. The bus access request on the second access bus 41 is output to the first access bus 35.

The clock signal CLK is supplied to the address/data memory control unit 59. The address/data memory control unit 59 receives the clock signal CLK and outputs the memory control signals S9 and S10. According to the type of the bus access request output from the operation processing block 45, the signals S9 and S10 are output when the data and address output from the operation processing block 45 are stable. Receiving the control signals S9 and S10, the address on the address-/data bus 43 is written into the address memory 55. The data on the address/data bus 43 is written into the data memory 57. The address stored in the address memory 55 is supplied to the multiplexer 51. The data stored in the data memory 57 is supplied to the multiplexer 53.

Let us assume that the stop request signal S5 derived from the stop request block 47 is set H, and the supply of the clock signal CLK is stopped.

Figure 1:
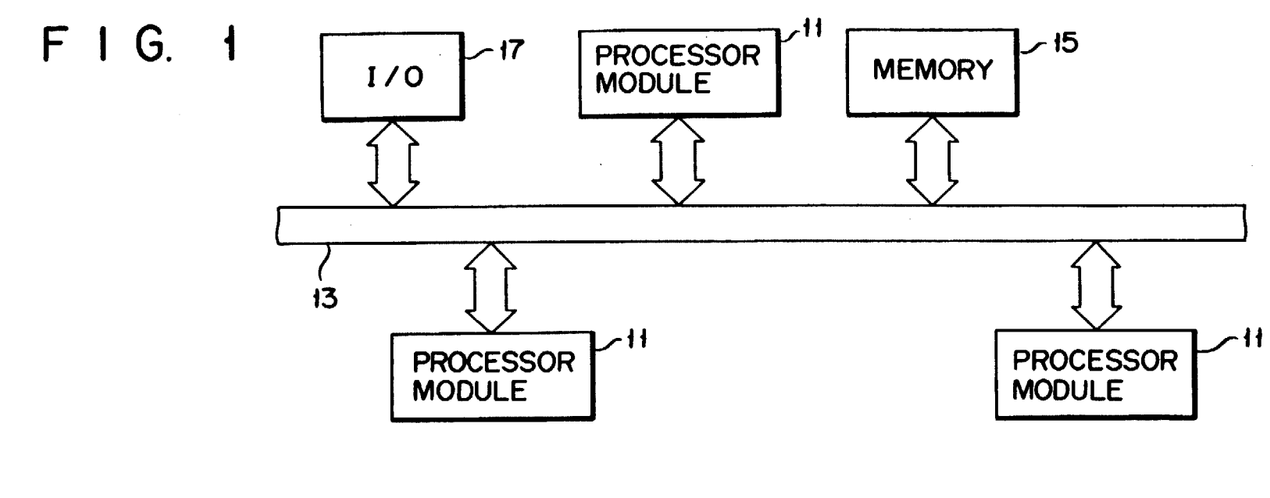
FIG. 1 is a block diagram illustrating an arrangement of a multiprocessor system according to an embodiment of the present invention.
Figures 4A, 4B:
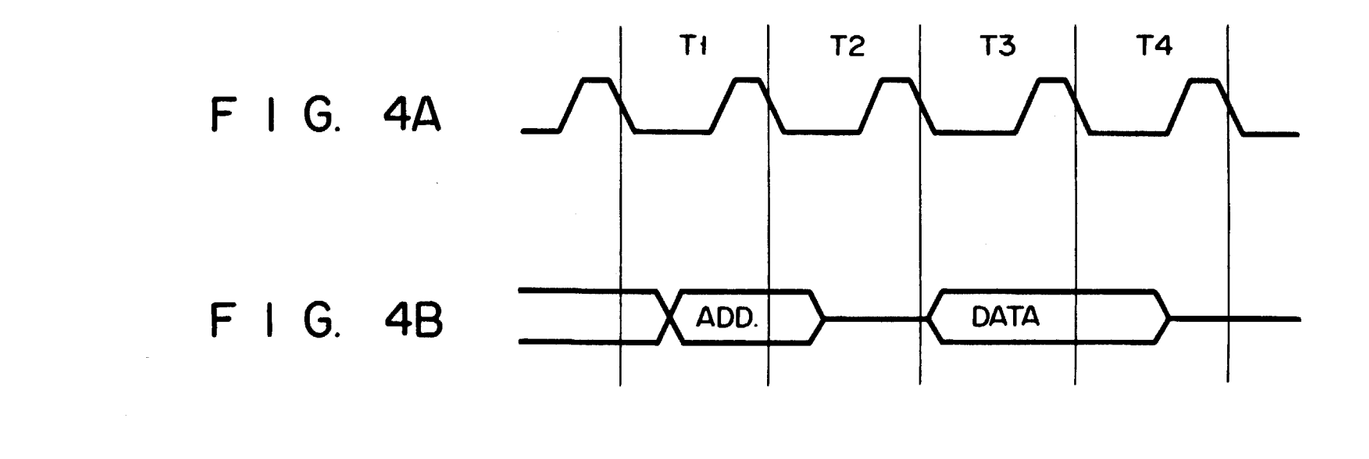
FIGS. 4A and 4B show timing charts useful in explaining the operation of the stop control block.

It is assumed that the clock signal CLK is stopped while data is being written into the memory 15 (FIG. 1). The read operation of data from the memory 15 is performed by four clocks (one bus cycle), as shown in FIGS. 4A and 4B. In this embodiment, it is further assumed that the clock signal CLK is stopped at the third clock of one bus cycle.

When the signal S5 is set H, the bus access type memory 63 stores the type of the bus access request on the second access bus 41. In this embodiment, a command representing the data write to the memory 15 is stored in the bus access type memory 63. Further, the access state memory 65, when receiving the H level signal S5, stores the state of the bus access. In this case, the third clock in one bus cycle is stored in the access status memory 65. During the normal operation, the address output from the operation processing block 45 is stored into the address memory 55, and the data is stored into the data memory 57.

The access request control unit 71, in response to the H level signal S5, sets the prohibit signal S8 at H level. In response to the H level prohibit signal S8, the multiplexer 61 is disabled. As a result, the bus 41 is electrically disconnected from the bus 35. Further, the bus access request on the bus 35 is made inactive (the signals concerning the bus access on the bus 35 are all set in H level). In response to this inactive bus access request signal, the bus arbitration block 21 sets the output control signal S1 at L level, and the busy signal BS at L level. Therefore, the processor module is electrically disconnected from the bus 13. Under this condition, other modules can use the bus 13. Then, during the period that the processor module is stopped, other modules perform their operations, respectively.

Then, it is assumed that the stop request of the clock signal CLK is removed. With removal of the stop request, the stop request block 47 (FIG. 2) sets the stop request signal S5 at L level. Upon receipt of this L level signal S5, the access request control unit 71 sets the signal S7 at H level, and the signal S8 at L level. Responsive to the signal S7, the multiplexers 51, 53 and 61 switch their bus selection. The multiplexer 51 selects the address stored by the address memory 55, and outputs it to the bus 37. The multiplexer 53 selects the data stored in the data memory 57, and outputs it to the data bus 39.

The bus access request (command indicating bus access) stored in the bus access type memory 63 is stored (transferred) into the at-restart bus access request memory 67 in response to the signal S7. The multiplexer 61 selects the contents (bus access request) of the at-restart bus access request memory 67, and outputs it onto the first access bus 35. Upon receipt of this request, the bus arbitration block 21 sets the signal S1 at H level. Subsequently, the processing, which was performed before the stoppage of supplying the clock signal CLK, is resumed from its beginning on the basis of the data and address output onto the buses 37 and 39.

In this case, a command to write data into the memory 15 is output onto the bus 35. The bus arbitration block 21 receives the clock signal CLK and enables the bus control block 23. The address output block 25 and the data input/output block 27 write data into the memory 15 on the basis of the data and address output respectively transferred from the address memory 55 and the data memory 57 through the multiplexers 51 and 53, and the buses 37 and 39. During the execution of this processing, the present access state is detected by the access detector 69. Specifically, the number of clocks after the restart of supplying the clock signal CLK is detected. The detected access state is supplied to the comparator 73. The contents of the access status memory 65 are also supplied to the comparator 73. As already described, the access state memory 65 stores the fact that the supply of the clock signal CLK was stopped at the 3rd clock of one bus cycle. The comparator 73 compares the two input data to check how the processing is progressing. When the data are coincident with each other, the comparator 73 produces the coincident signal S6 to the access request control unit 71. In this case, the coincident signal S6 starts when the third clock of the clock signal CLK is produced after the clock signal CLK is restarted. Upon receipt of the signal S6, the access request control unit 71 produces a L level signal S7. Therefore, the multiplexers 51, 53 and 61 select the data on the buses 43 and 41. The comparator 73 sets the restart signal S4 at H level. Subsequently, the clock signal CLK is supplied to the operation processing block 45.

The operation processing block 45, in response to the clock signal CLK, starts the operation after the stoppage, that is, the write operation subsequent to the 4th clock. Thereafter, the operation processing block 45 executes the data processing according to the program.

As seen from the foregoing, in the multiprocessor system according to the present invention, if in a processor module the supply of the clock signal is stopped, the stop control block 33 stores the contents (command) of the bus access immediately before the CLK supply stoppage, the status of the stoppage (the stoppage is made at the third clock), the address and the data. After the supply of the clock signal CLK is restarted, the stop control block 33 executes the contents of the bus access immediately before the stoppage on the basis of the command, the bus access state, the address and the data. After the write operation of data into the memory is coincident with the stored bus access state, the clock signal CLK is supplied to the operation processing block 45 for resuming operation. For this reason, the operation processing block 45 operates as if the bus access, as it was stopped before it is completed, is restarted from its beginning. Therefore, data transfer and data processing is performed exactly.

Exemplary arrangements of portions constituting the stop control block shown in FIG. 3 will be described referring to FIGS. 5 to 10.

Figure 5:
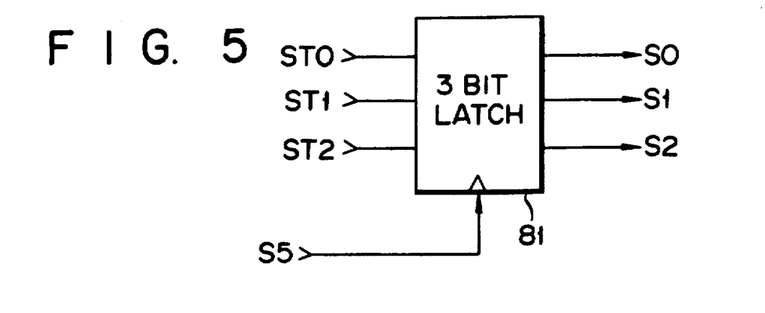
FIGS. 5 to 10 show arrangements of circuits used in the stop control block of FIG. 3.

The bus access type memory 63 is arranged to have a 3-bit latch 81, as shown in FIG. 5. Usually, the bus access request consists of 3 bit signals the bus 41. With this arrangement, the 3-bit signals indicating bus access request ST0 to ST2 are applied to the input terminals of the 3-bit latch 81. The stop request signal S5 is supplied to the clock input terminal of the latch 81.

The address memory 55 and the data memory 57 are each comprised of a latch, likewise. An 8-bit latch or a 16-bit latch is employed according to the number of bits of the address and the data. The at-restart bus access request memory 67 is comprised of a 3-bit latch.

Figure 6:
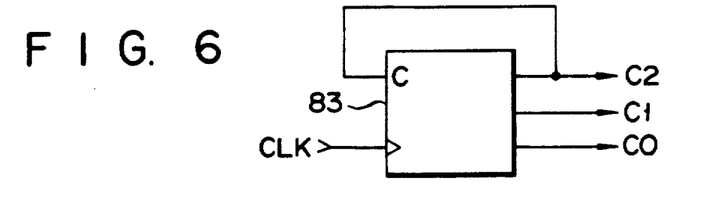

The access status memory 65 is made up of a counter 83, as shown in FIG. 6. Usually, the bus cycle of the multiprocessor consists of four cycles. If the counter which is cleared every four clocks is used, as shown in FIG. 6, each clock in the bus cycle can easily be distinguished.

Figure 7:
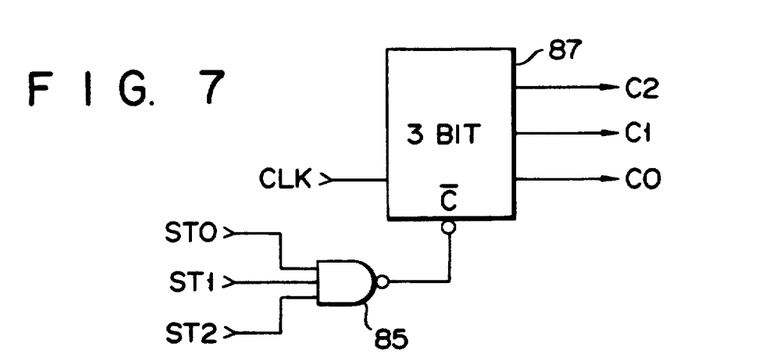

The access detector 69 is made up of a NAND gate 85 and a counter 87, as shown in FIG. 7. The 3 bit signals ST0 to ST2 constituting the bus access request are supplied to the NAND gate 85. The output signal of the NAND gate 85 is supplied to the clear terminal of the counter 87. The clock signal CLK is supplied to the clock terminal of the counter 87. When the processor module stops, the 3 bit signal constituting the bus access request are all set at H level by the multiplexer 61, as already mentioned. As a result, the counter 87 is cleared and counts the number of clocks in the clock signal CLK after the supply of the clock signal CLK starts again and the bus access request becomes active.

Figure 8:
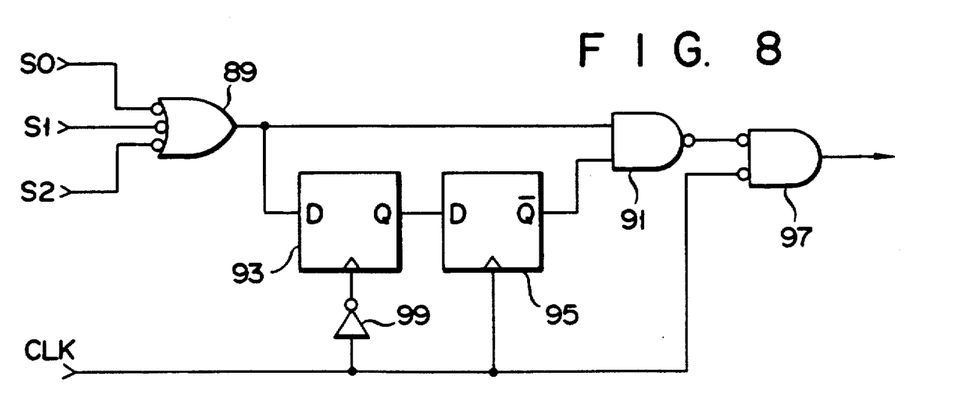

The address/data memory control unit 59 is arranged as shown in FIG. 8. The three bit signals ST0 to ST2 of the bus access request are applied to an OR gate 89 of the inverting type. The output signal of the OR gate 89 is supplied to one of the input terminals of an NAND gate 91 and a first D-type latch 93. The output signal of the first D type latch 93 is supplied to the D input terminal of a second D type latch 95. The $\overline{Q}$ output signal of the latch 95 is supplied to the other input terminal of the NAND gate 91. The output terminal of the NAND gate 91 is connected to one of the input terminals of an AND gate 97 of the inverting type. The clock signal CLK is connected to the other input terminal of the AND gate 97 and the clock input terminal of the second D type latch 95. The clock signal CLK is further applied to the clock input terminal of the first D type latch 93 through inverter 99.

With this arrangement, the signal S9 is output during a period that the first clock CLK is at L level after the bus access request is output, that is, during the period that the address is effective.

Figure 9:
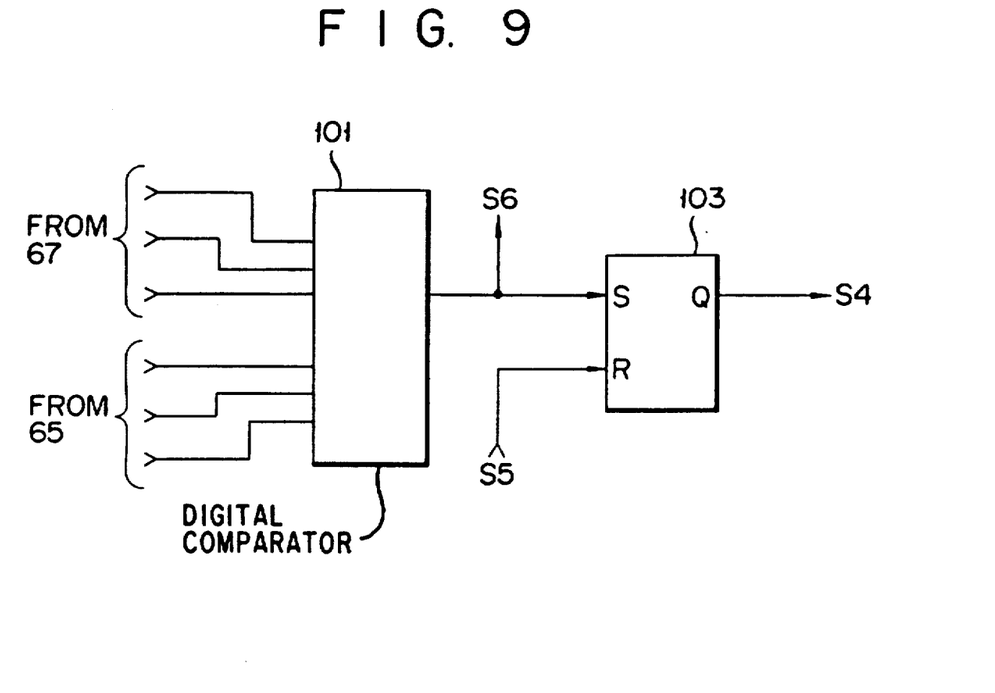

The comparator 73 made up of a digital comparator 101 and an RS flip-flop 103, as shown in FIG. 9. The comparator 101 receives the number of clocks output from the access detector 69 and the output signal of the access status memory 65, and compares them. When both of them are coincident with each other, the comparator 101 produces the signal S6. The signal S6 is supplied to the set input terminal of the RS flip-flop 103. Further, the signal S5 is supplied to the reset terminal of the flip-flop 103. With such an arrangement, when the output signal of the access detector 69 is coincident with the output signal of the access status memory 65, the coincident signal S6 is produced. The clock signal CLK is supplied to the operation processing block 45 after the stop control block 33 completes its predetermined processing after the restart of the supply of the clock signal CLK.

Figure 10:
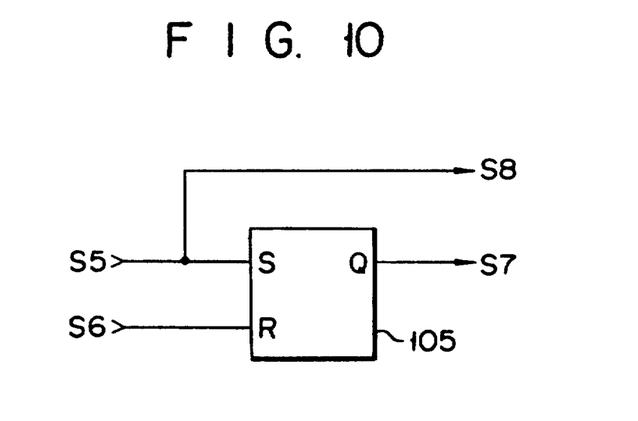

The access request control unit 71 is made up of an RS flip-flop 105, as shown in FIG. 10. The signal S5 is coupled with the set input terminal of the flip-flop 105. The signal S6 is supplied to the reset input terminal of the flip-flop 105. The Q output signal of the flip-flop 10 is used as the signal S7. The signal S5 is directly used as the signal S8. With this connection, when the signal S5 goes high (the supply of the clock signal CLK is stopped), the signal S7 also goes high to switch the select state of the multiplexer 51. When the signal S6 goes high (when the processing by the stop control block 33 reaches the progression of the processing immediately before the clock signal CLK is stopped after the restart of the CLK supply), the signal S7 is at L level, to return the state of selecting the multiplexer 51, for example, to the normal state. Further, after the signal S5 is in L level, a trigger pulse is supplied to the at-restart bus access request memory 67. When the signal S5 is in L level, the signal S8 is also in L level, to render the bus access type memory 63 enable. Then, the bus access request is output to the bus 35.

The clock signal supply block 29, the bus arbitration block 21, the bus control block 23, the address output block 25, the data input/output block 27, the address output block 25 and the like may be those which are known. For example, the clock signal supply block 29 may be comprised of a Model 8284A, an IC chip manufactured by Intel Corp. in U.S.A. This IC is not of the CMOS type and does not have the function for standby. Therefore, if the signal S5 is applied to the 8284A, the supply of the clock signal CLK can not be stopped. The commercially available components for those circuit blocks are: Model 8289 by Intel Corp. for the bus arbitration block 21; Model 8282 or 8283 by Intel Corp. for the address output block 25; Model 8286 or 8287 of IC chip by Intel Corp. for the data input/output block 27; Model 8086 or 8088 of IC chip (CPU) by Intel Corp. for the operation processing block 45. In the case of using Model 8086 or 8088, there is no need for the data memory 57, the multiplexer 53 and the control signal S10. The bus 39 is directly connected, as a part of the bus 43, to the operation processing block 45.

The stop request block 47 is connected to a self-diagnosis circuit (not shown). When the self-diagnosis circuit detects any trouble of the processor module, the stop request block 47 renders the stop request signal S5 high in response to the output signal from the self-diagnosis circuit. Receiving a stand-by mode request signal externally, the stop request block 47 raises the signal S5 to a high of level. The time point to stop the supply of the clock signal CLK by setting the signal S5 high in level by the stop request block 47, is not limited to that as mentioned above, but may be any time that the system requires.

It is evident that the circuit arrangement of the multiprocessor system is not limited to the above-mentioned one. Further, the logic level employed in the above-mentioned embodiment may be inverted, if necessary. The arrangement of each circuit section of course depends on the type of CPU, the type of common bus and the like.

When the processor module 11 is arranged as mentioned above, if one processor module stops its operation when it makes an access to the common bus 13, no busy signal BS is continuously produced. For this reason, a stand-by mode can be employed to temporarily stop the supply of a clock signal. This enables one to realize low power consumption of the system. Further, the undesired situation that the overall system is stopped can be avoided. Furthermore, outputting of no busy signal BS is continued, even if one processor module stops during its accessing of the bus 13 due to some trouble which can be self-diagnosed. Therefore, the overall system is never stopped. The stop control block 33 supports the processing which has been done immediately before the clock signal CLK stops. Therefore, if the operation processing block 45 executes the processing after the stoppage, the exact data can be restored.

What is claimed is:

1. A multiprocessor system having a bus for transmitting data and a plurality of processor modules, each connected to said bus, wherein each of said processor modules comprises:

clock signal supplying means for supplying a clock signal;

operation processing means, connected to said clock signal supplying means, for performing a bus access in response to said clock signal;

stop request means, connected to said clock signal supplying means, for stopping the supplying of the clock signal by said clock signal supplying means to said operation processing means;

memory means, connected to said operation processing means, for storing data indicating a status of the bus access when said stop request means stops the clock signal supply to said operation processing means;

connecting means, connected to said bus, for electrically disconnecting and connecting said processor module from said bus; and control means, connected to said clock signal supplying means, said operation processing means, said stop request means, said memory means, and said connecting means, for causing said connecting means to electrically disconnect said processor module from said bus when said stop request means stops the clock signal supply to said operation processing means, and, after the stopping of the clock signal supply is removed by said stop request means.

for causing said connecting means to electrically connect said processor module to said bus, for prohibiting the clock signal supply for said clock signal supplying means to said operation processing means, for restarting the bus access based on the status indicating data stored in said memory means, and for restarting the supplying of the clock signal to said operation processing means when a state of the restarted bus access by said control means coincides with a state of the bus access by said operation processing means when the clock signal supply to said operation processing means was stopped.

2. A multiprocessor system according to claim 1 wherein:

said memory means stores a type and state of the bus access performed by said operation processing means; and said control means restarts the bus access based on said type of bus access, and restarts the supplying of the clock signal to said operation processing means when a state of the restarted bus access by said control means coincides with the state of the bus access stored in said memory means.

3. A multiprocessor system according to claim 2 wherein:

said memory means includes bus access type memory means for storing said bus access type and access state memory means, connected to said clock signal supplying means, for storing a number of a clock cycle in one bus cycle of the clock signal when said stop request means stops the clock signal supply; and said control means further transfers information between said operation processing means and said bus when said clock signal is supplied to said operation processing means; electrically disconnects said operation processing means from said bus when said stop request means stops the clock signal supply; arbitrates a use of said bus between said processor module and other processor modules when the stopping of the clock signal supply is removed by said stop request means; and restarts the supplying of the clock signal to said operation processing means when the number of clock cycles of the clock signal after the restart of the bus access by said control means is coincident with the number of the clock stored in said access state memory means.

4. A multiprocessor system according to claim 3 wherein:

said access state memory includes a counter for storing the number of the clock cycle, wherein said counter is cleared in response to the clock signal at a start of a bus cycle; and said control means includes access detecting means containing a counter for counting the number of clock cycles after the restart of the bus access by said control means, comparing means, connected to said access state memory means and said access detecting means, for comparing the number of clock cycles stored in said access detecting means and the number of the clock cycle stored in said access state memory means; wherein said control means restarts the supplying of the clock signal to said operation processing means when the number of clock cycles in said access detecting means and the number of the clock cycle in said access state memory means are coincident with each other in said comparing means.

5. A multiprocessor system having a bus for transmitting data and a plurality of processor modules, each connected to said bus, wherein each of said processor modules comprises:

clock signal supplying means for supplying a clock signal;

operation processing means, connected to said clock signal supplying means, for performing a bus access in response to said clock signal;

address output means, connected to said bus, for producing an address necessary for a bus access;

data input/output means, connected to said bus, for inputting data from said bus and outputting data to said bus;

bus access control means, connected to said bus, for controlling a bus access;

stop request means, connected to said clock signal supplying means, for stopping the supplying of the clock signal by said clock signal supplying means to said operation processing means;

memory means, connected to said operation processing means, for storing data indicating a status of the bus access when said stop request means stops the clock signal supply to said operation processing means;

bus arbitration means, connected to said bus, for arbitrating a use of said bus between said processor module and other processor modules; and control means, connected to said clock signal supplying means, said operation processing means, said address output means, said data input/output means, said bus access control means, said memory means, and said bus arbitration means, for causing said bus arbitration means to electrically disconnect said processor module from said bus when said stop request means stops the clock signal supply to said operation processing means, and, after the stopping of the clock signal supply is removed by said stop request means, for controlling said bus arbitration means, said bus access control means, said address output means, and said data input/output means to restart the bus access based on the status indicating data stored in said memory means, and for restarting the supplying of the clock signal to said operation processing means when a state of the restarted bus access by said control means coincides with a state of the bus access by said operation processing means when the clock signal supply to said operation processing means was stopped.

6. A multiprocessor system according to claim 5 wherein: said memory means includes bus access type memory means for storing a type of the bus access performed by said operation processing means, and access state memory means for storing a number of a clock cycle in one bus cycle of the clock signal when said stop request means stops the clock signal supply; and said control means includes means for prohibiting a supply of a bus access request output from said operation processing means when said stop request means stops the clock signal supply to cause said bus arbitration means to electrically disconnect said processor module from said bus;

restart means for supplying the bus access type stored in said bus access type memory means to said bus arbitration means when said stop request means removes the stopping of the clock signal supply, for gaining a use of said bus, and for controlling said bus access control means, said address output means, and said data input/output means to restart the bus access;

access detecting means for counting the number of clock cycles of the clock signal after said stop request means removes the stopping of the clock signal supply; and means, connected to said access detecting means and said access state memory means, for comparing the number of clock cycles stored in said access detecting means and the number of the clock cycle stored in said access state memory means, for restarting the clock signal supply to said operation processing means when the number of clock cycles in said access detecting means and the number of the clock cycle in said access state memory means are equal to each other, and for causing said operation processing means to continue performing the bus access.

7. A multiprocessor system according to claim 6 wherein:

said access state memory means includes a counter for storing the number of the clock cycle, wherein said counter is cleared in response to the clock signal at a start of a bus cycle; and said access detecting means includes a counter for counting the number of clock cycles after said stop request means removes the stopping of the clock signal supply to said operation processing means.

8. A processor module comprising:

clock signal supplying means for supplying a clock signal;

operation processing means, connected to said clock signal supplying means, for performing a bus access command in response to the clock signal;

stop request means, connected to said clock signal supplying means, for stopping the supplying of the clock signal by said clock signal supplying means to said operation processing means;

bus arbitration means, connected to an external bus, for arbitrating a use of said external bus between said processor module and other processor modules, each connected to said bus, in response to said bus access command;

address output means connected to said external bus for outputting an address to said external bus;

data input/output means connected to said external bus for transferring data to and from said external bus;

bus access control means, connected to said external bus, said address output means, and said data input/output means, for controlling said address output means and said data input/output means in response to said bus access command;

stop control means, connected to said clock signal supplying means, said operation processing means, said stop request means, said bus arbitration means, and said bus access control means, for storing a status of a bus access by said operation processing means and for controlling said bus arbitration means to stop the bus access by said processor module when said stop request means stops the clock signal supply, and, after said stop request means removes the stopping of the clock signal supply;

for restarting the bus access based on the stored status of the bus access, and for supplying the clock signal to said operation processing means when a state of the restarted bus access by said control means coincides with a state of the bus access by said operation processing means when the clock signal supply to said operation processing means was stopped.

9. A processor module according to claim 8 wherein said stop control means includes:

means for storing the bus access command performed by said operation processing means when said stop request means stops the clock signal supply to said operation processing means;

access state memory means for storing a number of a clock cycle in one bus cycle of said clock signal when said stop request means stops the clock signal supply;

means for prohibiting a bus access command output from said operation processing means from being supplied to said bus arbitration means and for electrically disconnecting said processor module from said bus when said stop request means stops the clock signal supply;

restarting means for supplying the bus access command stored in said bus access command memory means to said bus arbitration means when said stop request means removes the stopping of the clock signal supply, for gaining a use of said bus, and for controlling said bus access control means, said address output means, and said data input/output means to restart the bus access; and means for restarting the supplying of the clock signal to said operation processing means when the number of clock cycles of the clock signal after said stop request means removes the stopping of the clock signal supply is equal to the number of the clock cycle stored in said access state memory means, and for causing the operation processing means to continue performing the bus access.

10. A multiprocessor system according to claim 9 wherein:

said access state memory means includes a counter for storing the number of the clock cycle, wherein said counter is cleared in response to the clock signal at a start of a bus cycle; and said stop control means further includes access detecting means including a counter for counting the number of clock cycles after said stop request means removes the stopping of the clock signal supply to said operation processing means.

* * * * *